Patented Feb. 22, 1927.

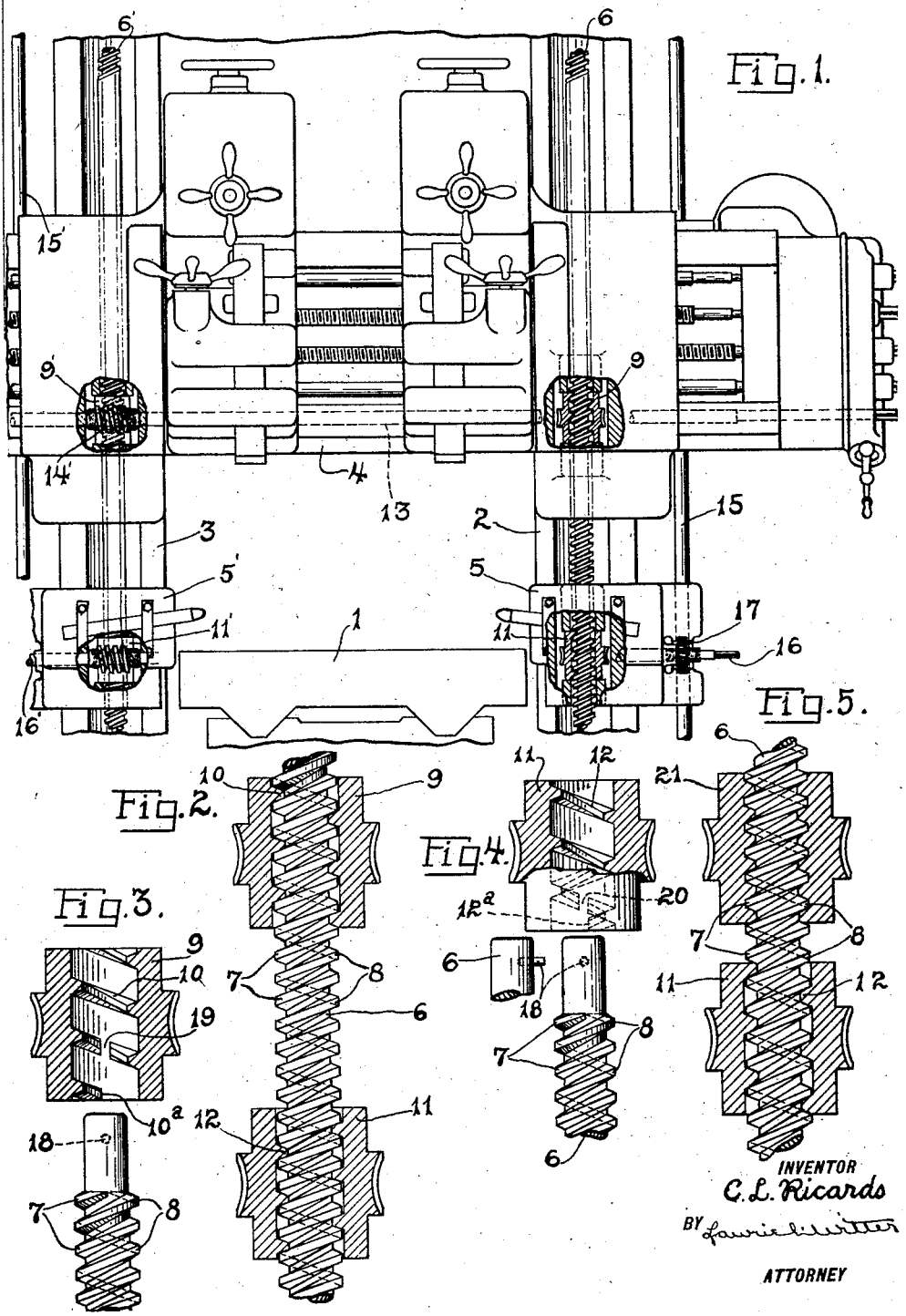

1,618,308

UNITED STATES PATENT OFFICE.

CHARLES L. RICARDS, OF PLAINFIELD, NEW JERSEY, ASSIGNOR TO NILES-BEMENT-POND COMPANY, OF NEW YORK, N. Y., A CORPORATION OF NEW JERSEY.

ADJUSTING MEANS FOR PLANER CROSS RAILS AND SIDE HEADS.

Application filed February 23, 1924. Serial No. 694,691.

This invention relates to machine tools and particularly to means for more accurately supporting and adjusting a plurality of tool supporting members.

In planers and like machines, a plurality of tool supporting members, as a cross rail and a tool supporting saddle or side head, are supported for vertical adjustment on one or more uprights. The vertical adjustment of these members is ordinarily accomplished by a screw in each upright. As both members are frequently adjusted over the same portions of the screw, such portions become worn sufficiently to effect the precision of the members. Such precision of the cross rail of a planer is particularly effected where one side head is used more extensively than the other, the screw in one upright thereby becoming worn sufficiently to allow the cross rail to sag on the side having the worn screw. The primary object of this invention is to provide an improved construction wherein this objection is entirely eliminated.

By providing the above mentioned screw or screws with double threads and supporting each member on a different thread, the wear incident to adjusting one member in no way effects the precision of the other member. It is an object of the invention to overcome the objection stated by providing the planer or like machine with improved adjusting mechanism of this type.

In the construction above defined, it is obvious that two independent supporting nuts will be provided on each screw, one nut being supported on one thread of the screw and the other nut on the other thread thereof. In assembling these nuts on the screws, it is of course essential that each nut shall be threaded to engage its respective supporting screw thread. It is another object of the invention to so construct these elements that these two nuts will always be assembled in their proper relations on the screw.

With the above and other objects in view, my invention consists in the features of construction and operation set forth in the following specification and illustrated in the accompanying drawing. In such drawing annexed hereto and forming a part of this specification, I have shown my invention embodied in a planer but it will be understood that the invention can be otherwise embodied and that the drawing is not to be construed as defining or limiting the scope of the invention, the claims appended to this specification being relied upon for that purpose.

Referring to the figures of the drawing.

Figure 1 is a fragmentary front elevation of a planer embodying my invention.

Fig. 2 is an enlarged fragmentary view partially in section showing the two supporting nuts threaded onto one of the upright screws.

Fig. 3 is a fragmentary view showing one of the nuts about to be assembled into threaded engagement with the screw.

Fig. 4 is a fragmentary view showing the other nut about to be assembled into threaded engagement with the screw.

Fig. 5 is a fragmentary view similar to Fig. 2 and illustrating a modification of the invention.

In the drawing, 1 indicates a planer table on opposite sides of which are respectively mounted uprights 2 and 3. A cross rail 4 and tool supporting saddles or side heads 5 and 5' are mounted for vertical adjustment on the uprights. The cross rail and side heads are adjustably supported by screws 6 and 6' extending along the uprights. As shown more particularly in Fig. 2, each of these screws is double threaded to provide two independent threads 7 and 8.

A pair of nuts 9 and 9' are rotatably mounted in the cross rail 4 and respectively in threaded engagement with the screws 6 and 6'. Each nut has a thread 10 adapted to operatively engage one of the said double threads, as the screw thread 7 in Fig. 2. Nuts 11 and 11' are respectively mounted in the side heads 5 and 5' and each of such nuts is provided with a thread 12 adapted to operatively engage one of the said double threads, as the screw thread 8 in Fig. 2. The nuts 9 and 9' can be rotated by a shaft 13 having worms such as shown at 14' thereon in engagement with worm wheel teeth on the nuts. The nut 11 can be rotated by a vertical shaft 15 operatively connected to a horizontal shaft 16 at 17, the horizontal shaft having a worm thereon engaging worm teeth on the nut. The nut 11' can be rotated by a like mechanism.

Since the cross rail and side heads are supported by independent threads 7 and 8 on the screws, the wear incident to adjusting one of these members will in no way affect the accuracy or precision of the other member. As shown in the drawing, the cross rail nuts 9 and 9' engage their respective screws in a like manner and the wear on each will therefore be substantially equal. The two ends of the cross rail will therefore always be at equal heights and the rail remain horizontal whatever be the adjustment thereof.

When assembling the nuts on the screws, it is of course essential that each nut shall be assembled in a manner to be supported on its respective screw thread, namely, the nut 9 to be supported on the screw thread 7 and the nut 11 to be supported on the screw thread 8. In Figs. 3 and 4, I have illustrated the nuts and screw so constructed that each nut will automatically engage its respective screw thread when assembled by the operator.

A pin 18 is seated in the nut assembling end of each screw and a convolution of the screw thread in each nut is slotted to permit the passage of the pin therethrough. In Fig. 3, the thread 10 of the nut 9 is slotted at 19. With these elements in axial alignment as illustrated in Fig. 3, the nut can be slid axially over the end of the screw, the pin passing through the slot 19. In such position, the start 10ª of the thread 10 will be in position to threadedly engage upon the screw thread 7 when the nut is rotated upon the screw. In this manner therefore the nut is necessarily engaged with its proper screw thread 7.

In Fig. 4, the thread 12 of the nut 11 is slotted at 20. With the nut and screw in the axial alignment illustrated, the nut can be slid axially over the end of the screw, the pin 18 passing through the slot 20. In such position, the start 12ª of the thread 12 will be in position to threadedly engage upon the screw thread 8 when the nut is rotated upon the screw. In this manner therefore the nut 11 is necessarily engaged with its proper screw thread 8.

It should be undersood that the initial construction of the nuts 9 and 11 are identical, the only difference being that the slots 19 and 20 are formed relatively 180° apart in such nuts. The nut in Fig. 4 is illustrated as turned 180° from the nut shown in Fig. 3. This difference brings the start 12ª of the thread at the front in position to engage on the screw thread 8, instead of at the rear to engage on the screw thread 7 as illustrated in Fig. 3. It will be noted that while the nuts are illustrated in these views as being relatively rotated 180°, the slots 19 and 20 are both illustrated as being at the rear of the nuts.

In some instances, it may be desirable to support the cross rail on both screw threads 7 and 8, the side heads being supported on one screw thread only. I have illustrated such a construction in Fig. 5 and it should be understood that my invention contemplates this construction and modifications thereof. The nut 21 in this arrangement is of course provided with a double thread. It should also be understood that while in the drawing I have illustrated and in the specification I have referred to the screws 6 and 6' as being "double threaded" screws, such illustration and terms are not to be hereinafter construed as limiting my invention specifically thereto since it is obvious that a screw with three or more threads is entirely within the scope of my invention.

What I claim is:

1. In a machine tool, the combination of an upright, two tool supporting members thereon, a double threaded screw extending along the upright, a nut threadedly engaging the screw and supporting one of the members, and another nut threadedly engaging one thread only of the screw, and supporting the other member.

2. In a machine tool, the combination of an upright, two tool supporting members thereon, a double threaded screw extending along the upright, a nut engaging one thread of the screw and supporting one of the members, and another nut engaging the other thread of the screw and supporting the other member.

3. In a machine tool, the combination of an upright, two tool supporting members thereon, a double threaded screw extending along the upright, a nut engaging one thread of the screw and supporting one of the members, another nut engaging the other thread of the screw and supporting the other member, means providing a relative rotation between the screw and one nut, and means for rotating the other nut.

4. In a machine tool, the combination of an upright, two tool supporting members thereon, a double threaded screw extending along the upright, a nut engaging one thread of the screw and supporting one of the members, another nut engaging the other thread of the screw and supporting the other member, and shafts for independently rotating the two nuts to adjust the members along the upright.

5. In a planer, the combination of a work table, a pair of uprights respectively at opposite sides thereof, a double threaded screw extending along each upright, a cross rail on the uprights, a pair of nuts threadedly engaging the screws and supporting the cross rail, a pair of tool supporting saddles respectively on the uprights beneath the cross rail, a pair of nuts respectively engaging one thread only of each screw and supporting the saddles, means providing a relative rotation between the screws and cross rail nuts, and means for independently rotating the saddle supporting nuts.

6. In a planer, the combination of a work table, a pair of uprights respectively at opposite sides thereof, a pair of screws respectively extending along the uprights, one of such screws having a double thread, a cross rail on the uprights, a pair of nuts engaging the screws and supporting the cross rail, a tool supporting saddle positioned on the upright having a double threaded screw, a nut engaging one thread only of the double threaded screw and supporting the saddle, and means for rotating the last named nut.

7. In a planer, the combination of a work table, a pair of uprights respectively on opposite sides thereof, a double threaded screw extending along each upright, a cross rail on the uprights, a pair of nuts respectively engaging one thread of each screw and supporting the cross rail, a pair of tool supporting saddles respectively mounted on the uprights beneath the rail, and a pair of nuts respectively engaging the other thread of each screw and supporting the saddles.

8. In a machine tool, the combination of an upright, two tool supporting members thereon, a double threaded screw extending along the upright, a pair of nuts adapted to threadedly engage such screw, and means comprising a cooperating pin and slot arrangement between the screw and nuts to insure the initial threaded engagement of one nut with one screw thread and the other nut with the other screw thread.

9. In a machine tool, the combination of an upright, two tool supporting members thereon, a double threaded screw extending along the upright, a pair of nuts adapted to threadedly engage such screw, and means comprising a pin in the screw cooperating with pin receiving slots in the threads of the nuts to insure the initial threaded engagement of one nut with one screw thread and the other nut with the other screw thread.

10. In a machine tool, the combination of an upright, two tool supporting members thereon, a double threaded screw extending along the upright, a pair of nuts adapted to threadedly engage such screw, and means comprising a pin in the screw cooperating with pin receiving slots in the threads of the nuts to insure the initial threaded engagement of one nut with one screw thread and the other nut with the other screw thread, the arrangement of the thread convolutions in the two nuts being substantially identical and the two slots therein being substantially 180° apart in the respective nuts.

In testimony whereof, I hereto affix my signature.

CHARLES L. RICARDS.